(12) United States Patent
Endoh et al.

(10) Patent No.: US 6,896,383 B2
(45) Date of Patent: May 24, 2005

(54) REFLECTING MIRROR SUPPORTING MECHANISM

(75) Inventors: Makoto Endoh, Tokyo (JP); Masaki Tabata, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/198,932

(22) Filed: Jul. 22, 2002

(65) Prior Publication Data

US 2003/0147160 A1 Aug. 7, 2003

(30) Foreign Application Priority Data

Feb. 5, 2002 (JP) ........................................ 2002-028479

(51) Int. Cl.[7] ............................................. G02B 7/182
(52) U.S. Cl. ...................... 359/872; 359/838; 359/848; 359/849; 359/871
(58) Field of Search ............................... 359/399, 838, 359/871–883, 872, 882, 846–849, 819, 820; 248/468, 477, 488, 473, 490, 491

(56) References Cited

U.S. PATENT DOCUMENTS

| | | | | |
|---|---|---|---|---|
| 4,664,487 A | * | 5/1987 | Tam ........................... 359/874 |
| 4,800,413 A | * | 1/1989 | Ito et al. ........................ 355/45 |
| 4,983,028 A | * | 1/1991 | Derenne et al. ............. 359/849 |
| 5,517,363 A | * | 5/1996 | Suzuki et al. ................ 359/819 |
| 5,825,490 A | * | 10/1998 | Haas et al. .................. 356/450 |

FOREIGN PATENT DOCUMENTS

JP          61-6614          1/1986

* cited by examiner

*Primary Examiner*—Drew A. Dunn
*Assistant Examiner*—Joshua L Pritchett
(74) *Attorney, Agent, or Firm*—Oblon, Spivak, McClelland, Maier & Neustadt, P.C.

(57) ABSTRACT

A reflecting mirror supporting mechanism has a reflecting mirror with countersinks in the side thereof, a mirror holder (a base) for supporting the reflecting mirror, and leaf springs which urge a base-side face of each of the countersinks against the mirror holder. The reflecting mirror is movable in an in-plane direction of the reflecting mirror, and the base-side face in each of the countersinks is parallel with the rear of the reflecting mirror. A first pad is disposed in a space between the leaf spring and the base-side face. In a space between the rear of the reflecting mirror and the mirror holder, a second pad is provided which is flat in shape in a contact portion with the rear of the reflecting mirror and is spherical in shape in a contact portion with the mirror holder.

10 Claims, 5 Drawing Sheets

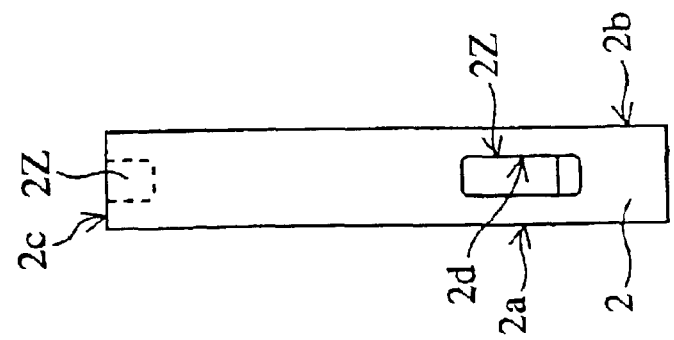
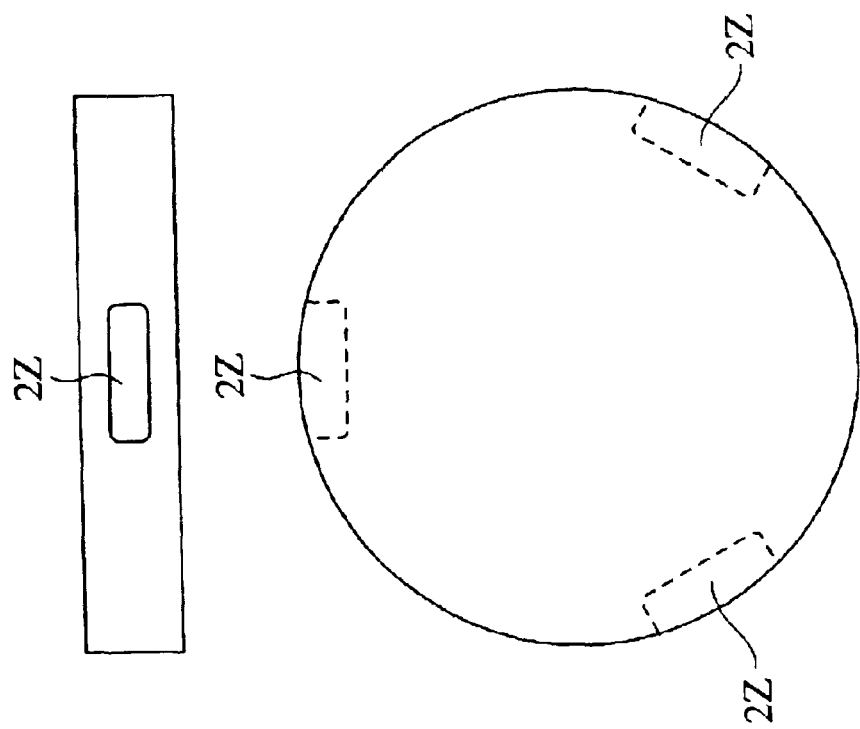

REFLECTING MIRROR SUPPORTING MECHANISM

BACKGROUND OF THE INVENTION

1. Field of the Invention

This invention relates to a reflecting mirror supporting mechanism used for a telescope, or the like.

2. Description of Related Art

FIGS. 4A and 4B are schematic explanatory drawings showing the construction of a reflecting mirror supporting mechanism of a first prior art, in which FIG. 4A is a plan view showing the supporting mechanism inclusive of the reflecting mirror and FIG. 4B is a sectional view taken along the line C—C in FIG. 4A. The hatching showing the cross section is partly omitted.

Referring to FIGS. 4A and 4B, reference numeral 31 denotes a reflecting mirror supporting mechanism. Reference numeral 32 denotes a reflecting mirror mounted on a telescope, or the like, reference numeral 32a a front as a reflecting surface of the reflecting mirror 32, and reference numeral 32b a rear of the reflecting mirror 32. Reference numeral 33 denotes a mirror holder for supporting the reflecting mirror 32. This reflecting mirror supporting mechanism 31 has a construction in which the reflecting mirror 32 is supported by urging it against the mirror holder 33 at three points near the peripheral of the reflecting mirror 32. The mirror holder 33 is positioned such that it covers the lower reflecting mirror 32 as well as the side of those three points of the reflecting mirror 32 against which the reflecting mirror 32 is urged. Reference numeral 33a denotes the above-described lower mirror holder, and reference numeral 33b denotes the side mirror holder. Reference numeral 34 denotes a leaf spring mounted, through a resin pad 35 to be described in more detail hereinafter, on the surface of the side mirror holder 33b. The leaf spring 34 urges the front 32a of the reflecting mirror 32 against the mirror holder 33a by the elastic force thereof.

Reference numeral 35 denotes the resin pad inserted into a spade between the leaf spring 34 and the front 32a of the reflecting mirror 32 in order to protect the front 32a of the reflecting mirror 32. Reference numeral 36 denotes another resin pad disposed in a space between the rear 32b of the reflecting mirror 32 and the lower mirror holder 33a in order to protect the rear 32b of the reflecting mirror 32. Reference numeral 37 denotes a filler filled into a space between the side of the reflecting mirror 32 and the side mirror holder 33b, and is made of a silicone rubber, or the like.

In this reflecting mirror supporting mechanism 31, the reflecting mirror 32 is supported and fixed in position by pinching the three points in the neighborhood of the peripheral of the reflecting mirror 32 by means of the mirror holder 33 and the leaf springs 34. The reflecting mirror 32 is supported by the elastic force in the thickness direction and is supported only by the friction force in the in-plane direction.

Next, another conventional reflecting mirror supporting mechanism will be described.

FIG. 5 is a schematic sectional view of a reflecting mirror supporting mechanism 41 in a second prior art disclosed in Published Unexamined Japanese Patent Application No. 6614/1986. Referring to FIG. 5, reference numeral 41 denotes a reflecting mirror supporting mechanism. Reference numeral 42 denotes a reflecting mirror mounted on a telescope, or the like. Reference numeral 42a denotes a front as the reflecting surface of the reflecting mirror, reference numeral 42b a rear of the reflecting mirror 42, and reference numeral 42c a groove formed around the periphery of the side of the reflecting mirror 42. Reference numeral 43 denotes a reflecting mirror housing holder for supporting the reflecting mirror 42. Reference numeral 44 denotes a split ring having a projection, and is fit into the groove 42c. Reference numeral 45 denotes a tightening ring screw, and reference numeral 46 a thread for coupling the reflecting mirror holder 43 and the tightening ring screw 45 together. Reference numeral 47 denotes a spring member such as a wave washer, or the like, provided in a space between the rear 42b of the reflecting mirror 42 and the reflecting mirror housing holder 43.

In this reflecting mirror supporting mechanism 41, the reflecting mirror 42 is supported and fixed in position by coupling the split ring 44 with the tightening ring screw 45 to the reflecting mirror housing 43 which holding down the split ring 44 by means of the tightening ring screw 45 in the thickness direction of the reflecting mirror 42. The urging force acted in the thickness direction of the reflecting mirror 42 is adjusted by the spring member 47.

However, the conventional reflecting member supporting mechanisms constructed as above entails the following problems.

In the case of the reflecting mirror supporting mechanism 31 of the first prior art, the urging force is directly acted on the front 32a of the reflecting mirror 32. Therefore, the front 32a of the reflecting mirror 32 near the leaf springs 34 as the points of load is largely deformed, deteriorating the specular accuracy. Further, since the leaf spring 34 as a foreign matter comes into contact directly with the front 32a of the reflecting mirror 32, the reflecting surface would be scratched.

On the other hand, in the case of the reflecting mirror supporting mechanism 41 of the second prior art, a compression force is acted in an in-plane direction of the reflecting mirror 42. Therefore, the reflecting mirror is deformed by this compression force, deteriorating the specular accuracy. Further, since the coefficient of thermal expansion of the reflecting mirror 42 and that of the split ring 44 are different from each other, the compression force is varied in the in-plane direction of the reflecting mirror 42 due to temperature changes in the reflecting mirror 42 and the reflecting mirror 42 supporting portion. As a result, the reflecting mirror 42 is deformed, thereby deteriorating the specular accuracy.

SUMMARY OF THE INVENTION

This invention has been made to solve the above and other problems and has an object of providing a reflecting mirror supporting mechanism capable of maintaining the specular accuracy of the reflecting mirror.

The reflecting mirror supporting mechanism according to the invention includes a reflecting mirror having a recess in a side thereof; a base for supporting the reflecting mirror; and an elastic member for urging a base-side surface of the recess against the base. It is thus possible to support and fix the reflecting mirror in position without directly holding down the front of the reflecting mirror. This provides a reflecting mirror supporting mechanism capable of maintaining the specular accuracy of the reflecting mirror.

BRIEF DESCRIPTION OF THE DRAWINGS

The above and other objects and the attendant advantages of the present invention will become readily apparent by reference to the following detailed description when considered in conjunction with the accompanying drawings wherein:

FIGS. 2A through 2C are explanatory drawings showing the reflecting mirror supporting mechanism;

DETAILED DESCRIPTION OF PREFERRED EMBODIMENTS

First Embodiment

Figure 1B:
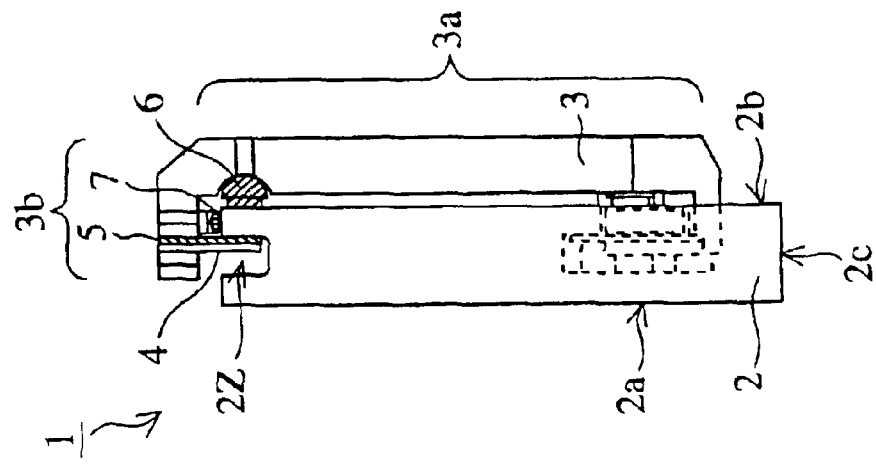
FIGS. 1A and 1B are schematic explanatory drawings showing the construction of a reflecting mirror supporting mechanism according to a first embodiment of the invention.
Figure 1A:
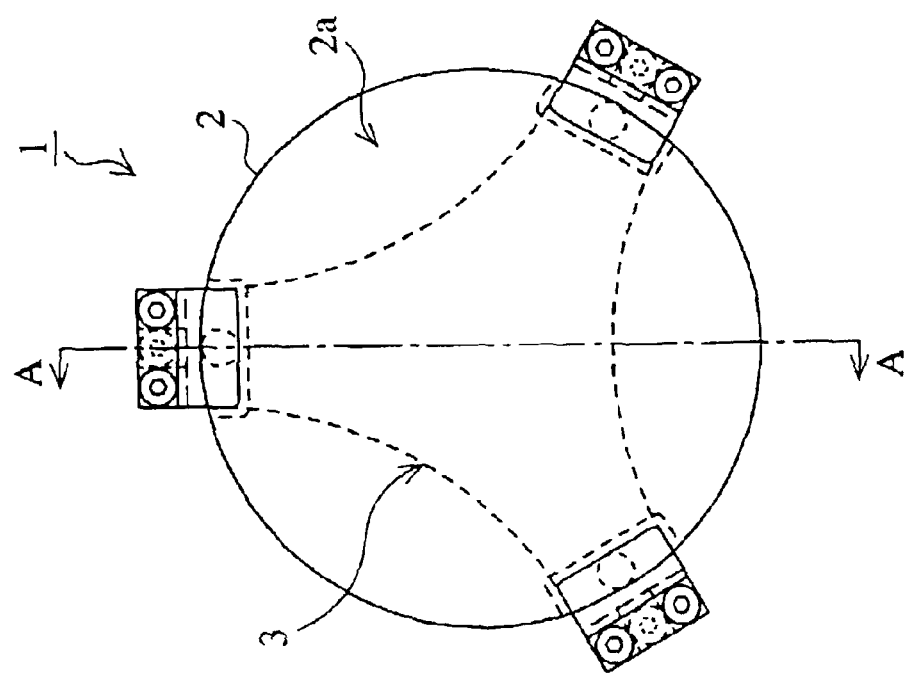

FIGS. 1A and 1B are schematic explanatory drawings showing the construction of a reflecting mirror supporting mechanism 1 according to the first embodiment of the invention, in which FIG. 1A is a plan view of the supporting mechanism inclusive of the reflecting mirror, and FIG. 1B is a sectional view taken along the line A—A in FIG. 1A. The hatching indicating the cross section is partly omitted. FIGS. 2A through 2C are explanatory drawings showing the reflecting mirror 2 constituting the reflecting mirror supporting mechanism 1, in which FIG. 2A is a plan view of the reflecting mirror, FIG. 2B is a side view and FIG. 2C is a top view, respectively, of the reflecting mirror in FIG. 2A.

Referring to FIGS. 1A and 1B, 2A through 2C, reference numeral 1 denotes a reflecting mirror supporting mechanism, reference numeral 2 a reflecting mirror mounted on a telescope, or the like, reference numeral 2a the front of the reflecting mirror 2, reference numeral 2b the rear of the reflecting mirror 2, and reference numeral 2c the side of the reflecting mirror 2. Reference numeral 2Z denotes a countersink (a recess) formed in three positions along the side 2c at an equal distance of 120° from one another with the center of the reflecting mirror 2 as an axis. Sometimes the countersink 2Z may be formed in more than three positions. The sectional form of the countersink 2Z is substantially in U-shape. The lower surface 2d (the front of a lower mirror holder 3a to be described later) of the countersink 2Z is parallel with the rear 2b of the reflecting minor 2. The countersink 2Z is each formed by, e.g., cutting work. Reference numeral 3 denotes a mirror holder (a base) for supporting the reflecting mirror 2. The reflecting mirror supporting mechanism 1 is of a construction in which the reflecting mirror 2 is supported by urging it at the three countersinks 2Z against the mirror holder 3. The mirror holder 3 is positioned in a manner to cover the rear of the reflecting mirror 2 as well as the sides of the three positions against which the reflecting mirror 2 is urged. Reference numeral 3a denotes the lower minor holder, and reference numeral 3b denotes the side mirror holder.

Reference numeral 4 denotes a leaf spring (elastic member) disposed on the side mirror holder through a resin pad 5 (first pad) to be described later, which urges, by the elastic force thereof, the base-side surface 2d of the countersink 2Z toward the lower mirror holder 3a. The urging force of the leaf spring 4 is a magnitude enough to allow for the movement of the reflecting mirror 2 in the in-plane direction.

Reference numeral 5 denotes the above-described first pad (first protection pad) inserted into the space between the leaf spring 4 and the base-side surface 2d of the countersink 2Z in order to protect the base-side surface 2b in the countersink 2Z. Reference numeral 6 denotes a second pad (second protection pad) disposed in a space between the rear 2b of the reflecting mirror 2 and the lower mirror holder 3a in order to protect the rear 2b of the reflecting mirror 2. The first pad 5 and the second pad 6 are made of a resin so that the reflecting mirror 2 is prevented from being subjected to scratching due to a direct contact with the leaf spring 4 or the mirror holder 3. The material to form the pad may be used other than a resin, as long as it is a soft material to prevent the reflecting mirror 2 from being scratched.

The second pad 6 is hemisphere in shape. The portion to be bought into contact with the rear 2b of the reflecting mirror 2 is flat in shape, and the portion to be brought into contact with the mirror holder 3a is spherical in shape. Therefore, even if a manufacturing error occurred in the reflecting mirror 2 or in the pad, the spherical portion of the pad rotates so that the flat portion comes into close contact with the rear 2b of the reflecting mirror 2. It is thus possible to avoid a partial contact (a state in which only one side edge of the pad is in contact with the reflecting mirror) which may occur in the case of a square pad due to a manufacturing error. The mirror holder 3a which comes into contact with the spherical portion of the pad is recessed so as to facilitate the positioning of the second pad 6.

Reference numeral 7 denotes a filler filled into the space between the side 2c of the reflecting mirror 2 and the side mirror holder 3b. The filler 7 is made of a silicone rubber, or the like, and prevents the reflecting mirror 2 and the mirror holder 3 from getting out of position due to vibrations or thermal deformation. Further, it prevents the reflecting mirror 2 from being damaged by striking against the mirror holder 3 when the reflecting mirror 2 moves in the in-plane direction.

In this reflecting mirror supporting mechanism 1, the reflecting mirror 2 is held and fixed in position by urging the three countersinks 2Z, provided along the side 2c of the reflecting mirror 2, against the mirror holder 3 by means of the leaf springs 4. The reflecting mirror 2 is held in the thickness direction by the elastic force and in the in-plane direction only by the friction force. The reflecting mirror 2 is movable to a certain degree in the in-plane direction.

As described above, according to the reflecting mirror supporting mechanism 1 of the first embodiment of the invention, the three countersinks 2Z formed along the side 2c of the reflecting mirror 2 are urged against the mirror holder 3 by means of the leaf springs 4. The reflecting mirror 2 can thus be supported and fixed in position without directly urging the front 2a of the reflecting mirror 2. This prevents the distortion of the front 2a of the reflecting mirror 2 and maintains the specular accuracy.

Further, according to the first embodiment of the invention, the reflecting mirror 2 is movable to a certain degree in the in-plane direction. This permits the change in the relative position between the reflecting mirror 2 and the supporting positions due to the difference in the coefficients of thermal expansion when a change in temperature has occurred. Accordingly, a compression force will not act in the in-plane direction of the reflecting mirror 2, and thus the deterioration of the specular accuracy can be prevented.

Still further, according to the first embodiment, the base-side face 2d of the countersink 2Z is parallel with the rear face 2b of the reflecting mirror 2. This prevents the occurrence of a partial pressure in the in-plane direction and the deterioration of the specular accuracy.

Moreover, according to the first embodiment, there are provided the first pad 5 which protects the base-side surface 2d in the countersink 2Z and the second pad 6 which protects the rear 2b of the reflecting mirror 2. This prevents the reflecting mirror 2 from being damaged by direct contact with the leaf spring 4 or with the mirror holder 3, and alleviates the occurrence of cracks on the reflecting mirror 2.

Still further, according to the first embodiment, the contact portion of the second pad 6 for protection of the rear 2b of the reflecting mirror 2 which comes into contact with the mirror holder 3 is spherical in shape. This prevents the partial contact of the pad. As a result, a local bending moment due to the partial contact of the pad does not occur, thereby preventing the deterioration of the specular accuracy.

Second Embodiment

In case the entire second pad is made of a resin as with the second embodiment, the coefficient of thermal expansion of the second pad is larger as compared with that of the surrounding parts. As a result, when a temperature change has occurred, the reflecting mirror deforms due to the thermal deformation of the second pad, and the specular accuracy will be deteriorated. In the second embodiment, a description thereof will be made by focusing on the case in which the second pad is partly made of a material to decrease coefficient of thermal expansion of the second pad.

Figure 3B:
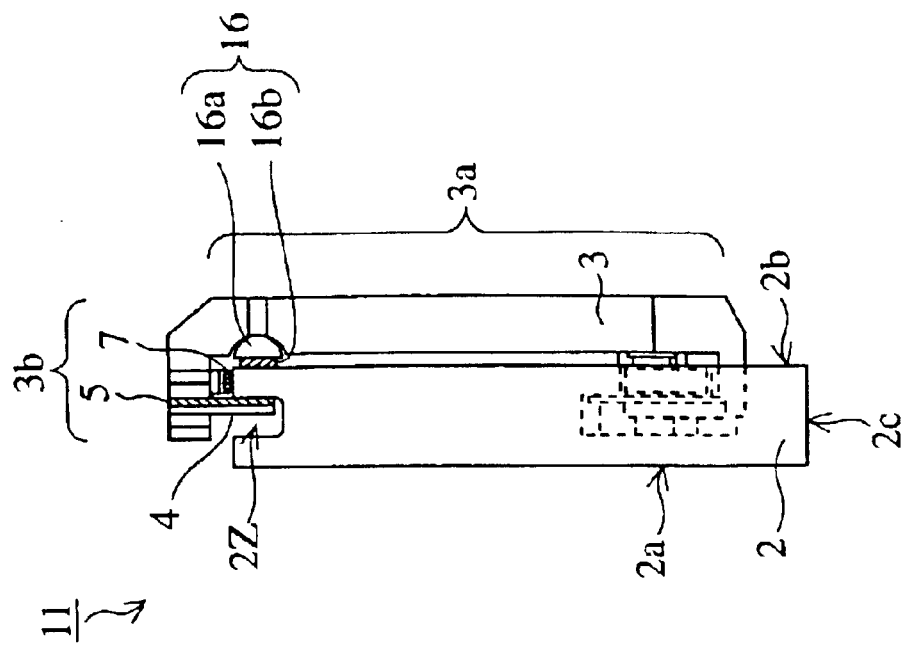
FIGS. 3A and 3B are schematic explanatory drawings showing the construction of a reflecting mirror supporting mechanism according to a second embodiment of the invention.
Figure 3A:
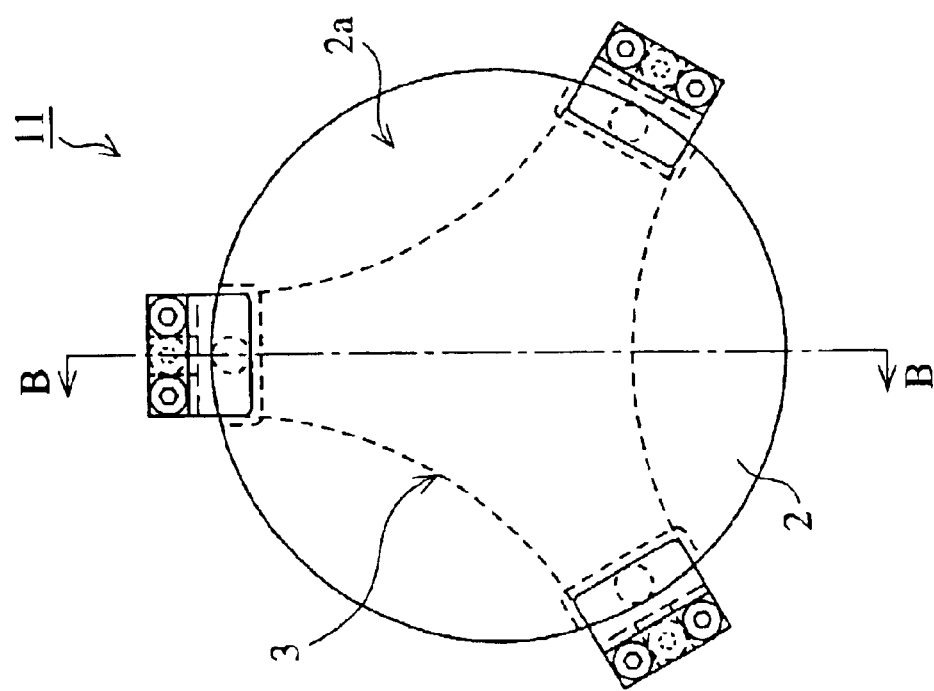
Figure 4B:
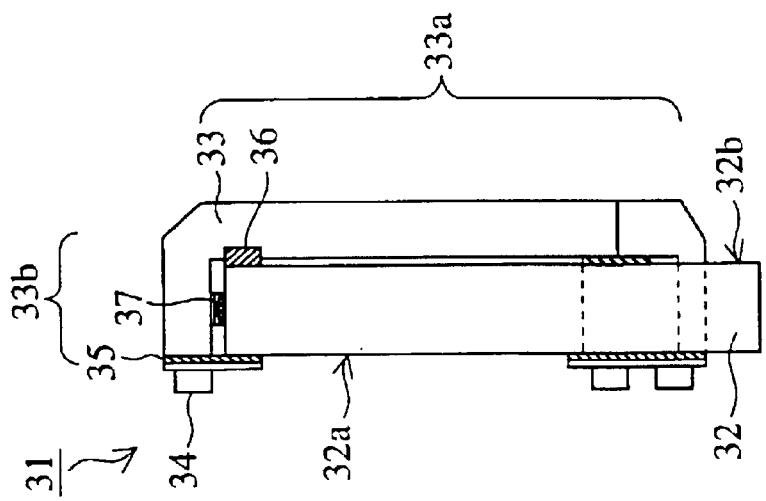
FIGS. 4A and 4B are schematic explanatory drawings showing the constitution of a reflecting mirror supporting mechanism of a first prior art.
Figure 4A:
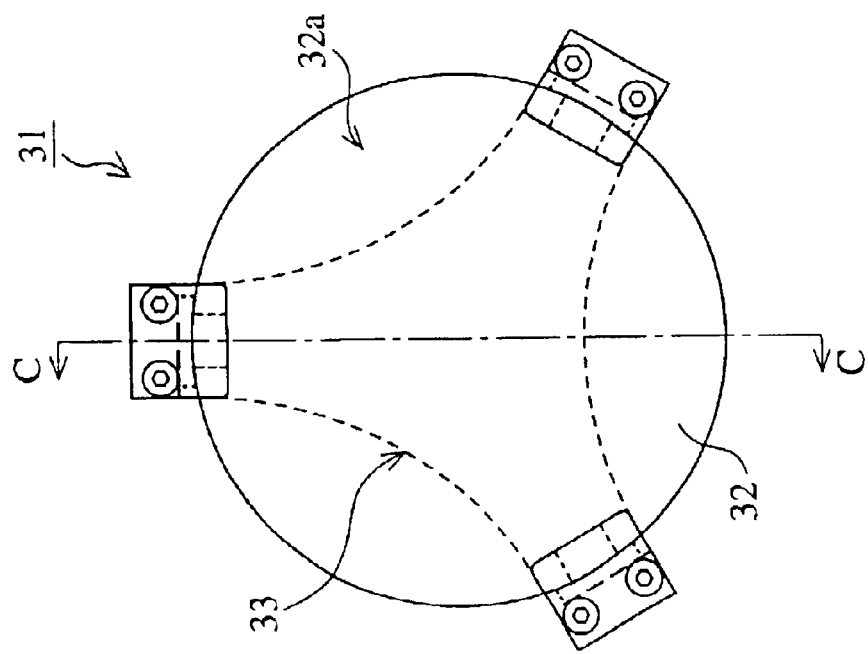
Figure 5:
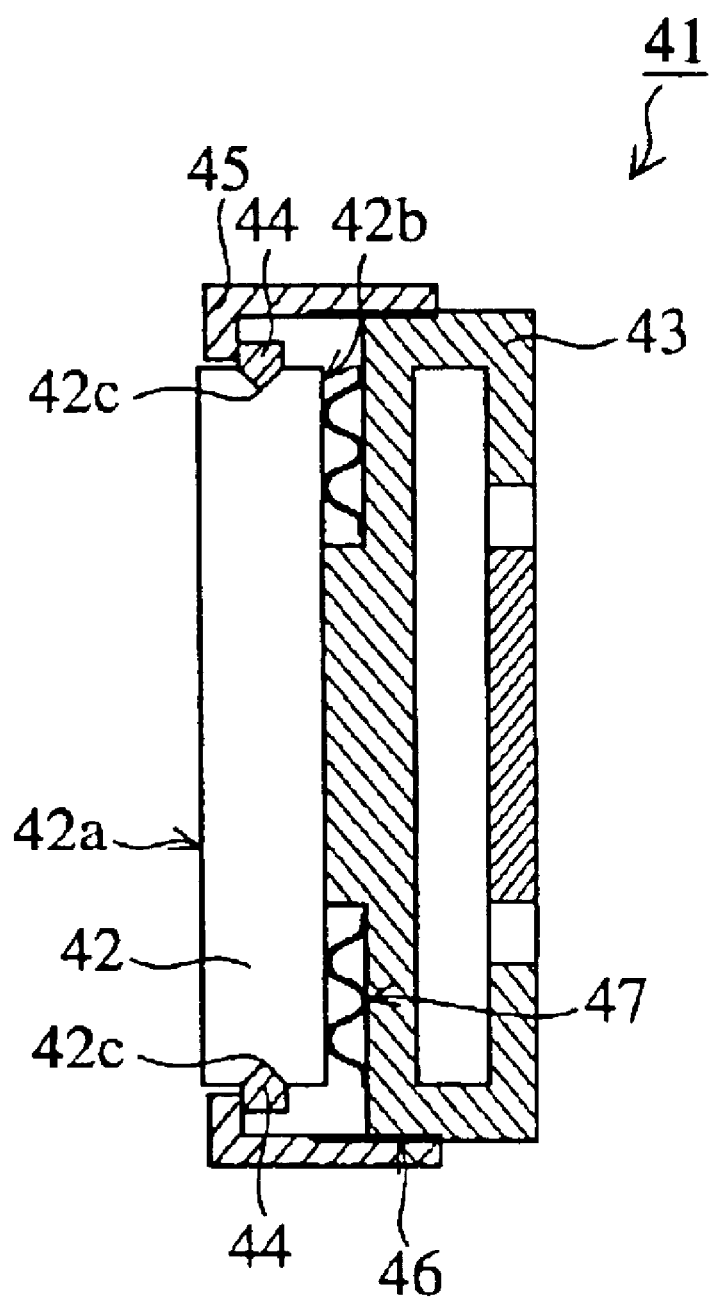
FIG. 5 is a schematic sectional view of a reflecting mirror supporting mechanism of a second prior art.

FIGS. 3A and 3B are schematic explanatory drawings of the construction of a reflecting mirror supporting mechanism 11 according to the second embodiment of the invention, in which FIG. 3A is a plan view of the supporting mechanism inclusive of the reflecting mirror, and FIG. 3B is a sectional view taken along the line B—B in FIG. 3A. The hatching indicating the cross section is partly omitted.

Referring to FIGS. 3A and 3B, reference numeral 11 denotes a reflecting mirror supporting mechanism. Reference numeral 16 denotes a second pad (a second protection pad) provided between the rear 2b of the reflecting mirror 2 and the lower mirror holder 3a (base) in order to protect the rear 2b of the reflecting mirror 2. Reference numeral 16a denotes a base-side pad which comes into contact with the mirror holder 3a. Reference numeral 16b denotes a mirror-side pad which comes into contact with the rear 2b of the reflecting mirror 2. The second pad 16 is formed into a double-layer structure consisting of the mirror-side pad 16b on the reflecting mirror side and the base-side pad 16a on the mirror holder 3a side. The mirror-side pad 16b is made of a resin. The base-side pad 16a is made of a material having a lower coefficient of thermal expansion than that of the mirror-side pad 16b. The material of the base-side pad 16a is, e.g., an alloy of ultra small thermal expansion known as a superinvar. The base-side pad 16a and the mirror-side pad 16b are formed, e.g., by machining work. The mirror-side pad 16b and the base-side pad 16a are fixed in position by the urging force of the leaf spring 4.

Like reference numerals of the first embodiment indicate like components and therefore descriptions thereof are omitted.

As described above, according to the second embodiment, the second pad 16 for protecting the rear 2b of the reflecting mirror 2 is formed into a double-layer structure consisting of the base-side pad 16a which comes into contact with the mirror holder 3a and the mirror-side pad 16b which comes into contact with the rear 2b of the reflecting mirror 2. The mirror-side pad 16b is made of a resin and the base-side pad 16a is made of a material having a lower coefficient of thermal expansion than that of the resin. This becomes smaller the difference between the coefficient of thermal expansion of the second pad 16 and the coefficients of thermal expansion of the surrounding parts, and reduces the deterioration of the specular accuracy due to the difference in the coefficients of thermal expansion.

Further, according to the second embodiment, the base-side pad 16a is made of an alloy of an ultra small thermal expansion. When a difference in temperature has occurred in each of the three positions for supporting the reflecting mirror 2, this minimizes the force acting on each point, preventing the deterioration of the specular accuracy.

It is readily apparent that the above-described reflecting mirror supporting mechanism meets all of the objects mentioned above and also has the advantage of wide commercial utility. It should be understood that the specific form of the invention herein described is intended to be representative only, as certain modifications within the scope of these teachings will be apparent to those skilled in the art.

Accordingly, reference should be made to the following claims in determining the full scope of the invention.

What is claimed is:

1. A reflecting mirror supporting mechanism comprising:
   a reflecting mirror having a U-shaped recess in a peripheral side thereof;
   a base for supporting said reflecting mirror;
   an elastic member for urging a base-side surface of the recess against said base; and
   a protection pad disposed between the rear of the reflecting mirror and said base, said protection pad having a double layer construction,
   wherein said elastic member comprises a leaf spring which has an elastic force for urging the base-side surface of the recess toward said base.

2. The reflecting mirror supporting mechanism according to claim 1, wherein said reflecting mirror is movable in an in-plane direction of said reflecting mirror.

3. The reflecting mirror supporting mechanism according to claim 1, further comprising a first protection pad for protecting the base-side surface of the recess, said first protection pad being disposed between said elastic member and the base-side surface of the recess.

4. The reflecting mirror supporting mechanism according to claim 1, wherein the base-side surface of the recess is parallel with a rear surface of said reflecting mirror.

5. The reflecting mirror supporting mechanism according to claim 1, further comprising a filler member provided between the peripheral side of said reflecting mirror and said base.

6. The reflecting mirror supporting mechanism according to claim 1, wherein said double layer construction comprises a mirror-side pad which includes the contact portion with the rear of said reflecting mirror and a base-side pad which includes the contact portion with said base.

7. The reflecting mirror supporting mechanism according to claim 6, wherein a material of said base-side pad has a smaller coefficient of thermal expansion than a material of said mirror-side pad.

8. A reflecting mirror supporting mechanism comprising:
   a reflecting mirror having a recess in the side thereof;
   a base for supporting said reflecting mirror;
   an elastic member for urging a base-side surface of the recess against said base; and a protection pad for protecting the rear of said reflecting mirror, said protection pad being disposed between the rear of said reflecting mirror and said base and being flat in shape in a contact portion with the rear of said reflecting mirror and spherical in shape in a contact portion with said base.

9. The reflecting mirror supporting mechanism according to claim 8, wherein said protection pad is formed into a double layer construction comprising a mirror-side pad which includes the contact portion with the rear of said reflecting mirror and a base-side pad which includes the contact portion with said base, and wherein a material of said base-side pad has a smaller coefficient of thermal expansion than a material of said mirror-side pad.

10. The reflecting mirror supporting mechanism according to claim 9, wherein said base-side pad is made of an alloy of ultra small thermal expansion.

* * * * *